Patented Feb. 17, 1931

1,793,220

UNITED STATES PATENT OFFICE

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE

DRYING OIL AND METHOD OF PRODUCING THE SAME

No Drawing.        Application filed March 15, 1927.   Serial No. 175,639.

My invention relates to a drying oil and method of producing same. More particularly my invention relates to a drying oil comprising essentially terpene hydrocarbons.

Heretofore polymerized terpene hydrocarbons such as may be produced from turpentine, pine oil, etc. have not been available for uses such as customarily dictate the use of linseed oil, more especially because such polymerized terpene hydrocarbons do not dry with sufficient rapidity.

Now, in accordance with my invention, I have discovered that if polymerized terpene hydrocarbons be treated in a certain manner hereinafter fully described, a product will be obtained which will be adapted for use as a drying oil and which will not only possess the desirable fast drying qualities of linseed oil, but will also yield a film possessing desirable qualities.

In carrying out the process resulting in the production of the drying oil, in accordance with my invention, I prefer to treat a polymerized terpene hydrocarbon product, which I will call Dipolymer and which has a specific gravity around 0.950, say within substantially the range 0.945–0.960, and has a boiling range substantially such that 5% distils off at 210° C., 20% at 320° C., 50% at 335° C., and 75% at 350° C. Dipolymer comprises a mixture of terpene hydrocarbons of different degrees of polymerization, including a diterpene polymer, the polymers $(C_{10}H_{16})_3$, $(C_{10}H_{16})_4$, and probably still higher boiling polymers $(C_{10}H_{16})x$. Dipolymer may be prepared from terpene alcohols or hydrocarbons such, for example, as pine oil, terpentine, or dipentene, by treating in liquid phase in the presence of a catalyst, for example, such as fuller's earth or a metallic chloride, or by vaporizing the pine oil, turpentine, or dipentene, and contacting the vapors with the catalyst. Processes such as indicated for the production of Dipolymer are more fully described in applications for United States patents filed by me on July 20, 1926 and respectively Serially Numbered 123,812, 123,816, 123,817 and 123,818.

Dipolymer may be treated for the production of a drying oil by distilling off the low boiling end, amounting to approximately 70% and comprising primarily the diterpene $(C_{10}H_{16})_2$ fraction of Dipolymer.

In carrying out the treatment of Dipolymer involving separation of the light end, the Dipolymer fraction distilling below about 335° C. is largely removed either by simple or fractional distillation, thus eliminating the slow drying diterpene cut which has a specific gravity of about 0.945. The viscous residue, which will distil largely above 335° C. will contain the higher boiling polymers as, for example $(C_{10}H_{16})_3$, $(C_{10}H_{16})_4$ and $(C_{10}H_{16})x$. This residue may be used as a substitute for linseed oil and will give a film which will have good drying qualities comparable to those of linseed oil.

While the residue left after distilling off the diterpene fraction may be used without further treatment as a drying oil, as indicated, it may be desirable to separate the residue into its several polymers. Separation of the residue may be accomplished by distilling off a second cut, boiling approximately within the range 335° C.–360° C., which will have good drying qualities, though it is hardly as good as linseed oil. Further heating of the residue will give a third cut distilling approximately within the range 360° C.–375° C., which dries practically as fast as linseed oil and finally a fourth cut may be obtained, distilling approximately within the range 375° C.–400° C. which will also give a film which dries as well as a linseed oil film.

The third and fourth cuts indicated above are yellow in color and have the appearance of soft rosins. The residue remaining from the cut distilling within the range 375° C.–400° C. is hard and resembles a grade D rosin, but has an acid number of only about 0.5. It is insoluble in 95% ethyl alcohol and when dissolved in benzene, turpentine, or other solvent, it yields a film which quickly hardens.

In the treatment of Dipolymer by distillation, it is preferable to distil off the diterpene fraction, as well as the other cuts, if made, under reduced pressure, since this procedure results in the production of products of better color and odor than can be obtained if the distillation is effected at atmospheric pressure.

Dipolymer as a whole, or the diterpene fraction may be treated for the production of the drying oil in accordance with my invention by partially oxidizing it with air, as by blowing with air, to convert it into a partially oxdized polymer or polymers.

The partial oxidation of Dipolymer, or of the diterpene cut, may be accomplished either by exposing Dipolymer or the diterpene fraction in a thin layer to the air, or by passing air or oxygen through it, for a period of time, either with or without the application of heat. It is preferable, though not essential, that a small amount of dryer, as for example, 1–5% of liquid japan dryer, be dissolved in Dipolymer, or the diterpene cut, before oxidation in order to decrease the time required for the operation.

As an example of the carrying out of my process involving partial oxidation, a quantity of the diterpene cut may be blown with air for say 20 hours at room temperature with the result that its specific gravity will be raised from about 0.945 to about 0.948 and its speed of drying increased to practically that of linseed oil. Alternatively a quantity of the diterpene cut may be heated to a temperature, for example, of 150° C.–250° C. and blown with air, with the result that its specific gravity will be raised to about 0.967 and its speed of drying increased to practically that of linseed oil.

It will now be observed that my invention contemplates either the elimination from a polymerized terpene hydrocarbon product, referred to as Dipolymer, of at least the major portion of the lower boiling polymers or of the major portion of the diterpene polymer $(C_{10}H_{16})_2$, as by fractional distillation, or partial oxidation of either Dipolymer or its diterpene cut; either procedure results in the production of drying oils comprising essentially polymers or partially oxidized polymers, of a higher boiling range, or specific gravity, than that of the diterpene polymer.

It will be noted that the drying oils made in accordance with my invention will be comparable with linseed oil in speed of drying and will be miscible with linseed oil, or China wood oil and may be blended with these and will also be miscible with turpentine, mineral spirits, etc. The film given by the polymers is insoluble in gasoline and much more resistant to alkali than a linseed oil film. Dipolymer is neutral, hence, less effected by pigments than linseed oil.

Having now fully described my invention, what I claim and desire to protect by Letters Patent is:—

1. As a drying oil, a polymerized terpene product comprising mainly polymers having a higher boiling range than that of the polymer $(C_{10}H_{16})_2$.

2. As a drying oil, a polymerized terpene product which will distil largely above 335° C.

3. As a drying oil, a polymerized terpene product which will distil largely above 360° C.

4. As a drying oil, Dipolymer from which the polymer $(C_{10}H_{16})_2$ has been substantially removed.

5. The method of producing a drying oil from a polymerized terpene product, which includes treating a polymerized terpene product for the substantial removal therefrom of the polymer $(C_{10}H_{16})_2$.

6. The method of producing a drying oil from a polymerized terpene product, which includes distilling from a polymerized terpene product that portion which distills below about 335° C.

7. The method of producing a drying oil from a polymerized terpene product, which includes distilling a polymerized terpene product for the substantial removal therefrom of the polymer $(C_{10}H_{16})_2$.

8. The method of producing a drying oil from a terpene product, which includes polymerizing a terpene product and fractionating the polymerized product for the substantial removal therefrom of the polymer $(C_{10}H_{16})_2$.

9. The method of producing a drying oil from Dipolymer, which includes distilling Dipolymer for the substantial removal therefrom of the polymer $(C_{10}H_{16})_2$.

10. The method of producing drying oils from Dipolymer, which includes distilling Dipolymer for the substantial removal therefrom of the polymer $(C_{10}H_{16})_2$, fractionating the residue and separately collecting the higher boiling polymers.

In testimony of which invention, I have hereunto set my hand, at Kenvil, N. J., on this 11th day of March, 1927.

IRVIN W. HUMPHREY.